United States Patent
Klatt

[15] 3,651,514
[45] Mar. 21, 1972

[54] SYNCHRO-TO-DIGITAL CONVERTER

[72] Inventor: Robert Walter Klatt, Glastonbury, Conn.

[73] Assignee: Fairchild Industries, Inc., Farmingdale, L.I., N.Y.

[22] Filed: Mar. 25, 1970

[21] Appl. No.: 22,585

[52] U.S. Cl. .................................................340/347 SY
[51] Int. Cl. .....................................................H03k 13/02
[58] Field of Search ............................................340/347 SY

[56] References Cited

UNITED STATES PATENTS 3,482,242  12/1969  Hargrove ..........................340/347 SY
3,438,026  4/1969  Prill ..................................340/347 SY

FOREIGN PATENTS OR APPLICATIONS 1,344,337  10/1963  France ..............................340/347 SY Primary Examiner—Thomas A. Robinson
Assistant Examiner—Jeremiah Glassman
Attorney—Michael W. York

[57] ABSTRACT

A synchro-to-digital converter in which the synchro output signals are demodulated and successively sampled and the samples combined to provide a sinusoidal waveform, the phase of which depends upon the angle of the synchro rotor. The phase difference between this sinusoidal waveform and a reference signal is measured by a digital counter which provides a digital readout which corresponds to the angle of the synchro rotor.

16 Claims, 7 Drawing Figures

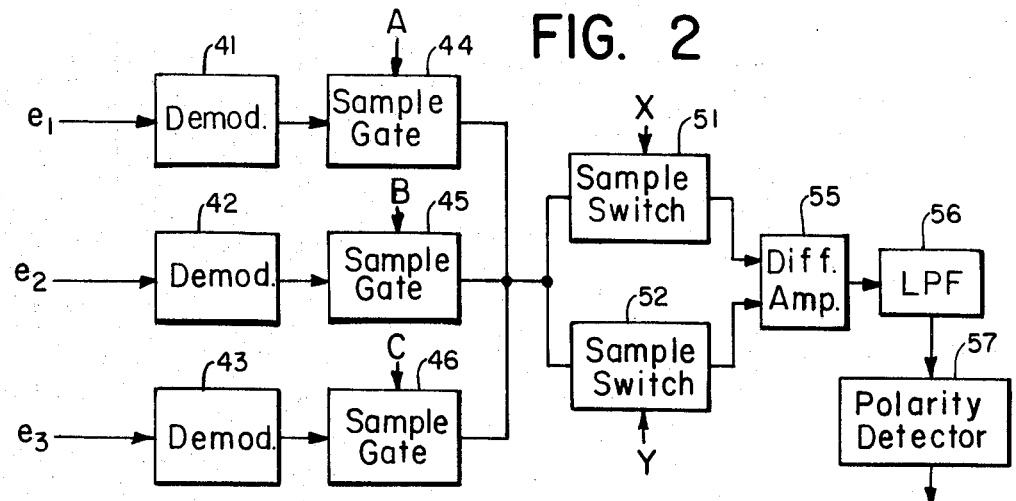
FIG. 2
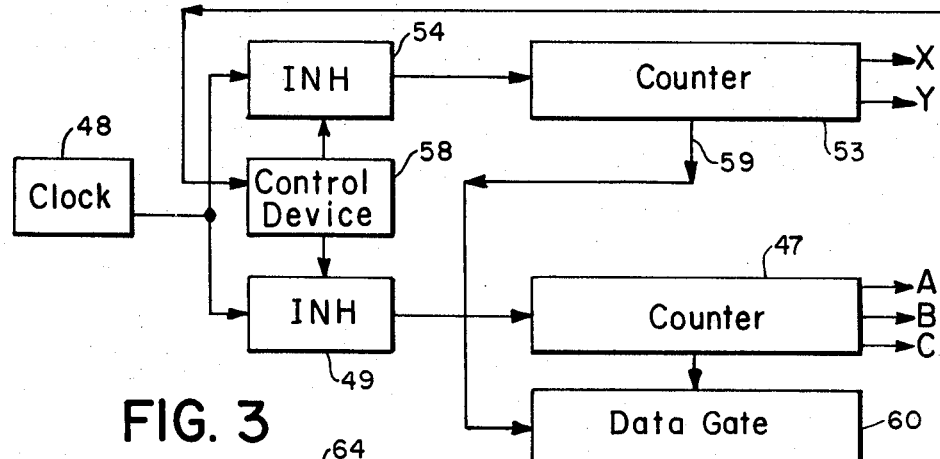
FIG. 3
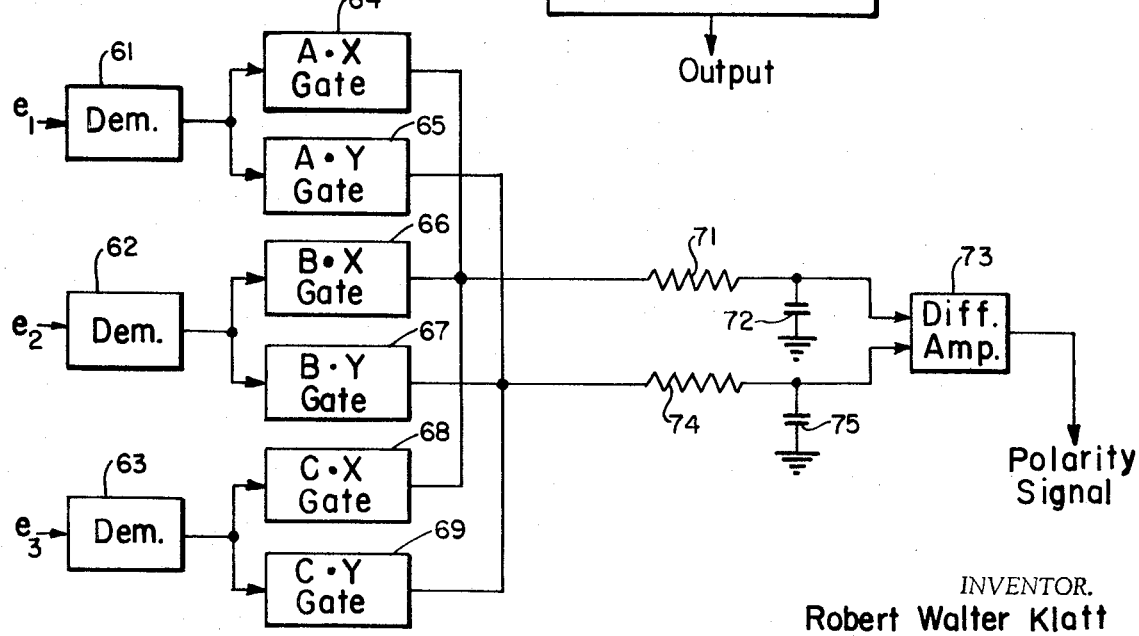
INVENTOR.
Robert Walter Klatt
BY
Darby + Darby
ATTORNEYS

SYNCHRO-TO-DIGITAL CONVERTER

This invention relates to apparatus for converting the information contained in the sinusoidal output signals from a synchro transmitter to a digital signal representing the angle of the rotor in the synchro transmitter.

Synchro transmitters and receivers are commonly used in remote indication systems in which it is desired to produce at one location an indication of a shaft angle at another location. For example, many radar antennas are designed to rotate 360°, but are located in places where it is not possible for the operator to observe them directly. Therefore, a data transmission system is employed to indicate to the operator the direction in which the remotely located antenna is pointed. This may be accomplished by mechanically connecting a synchro transmitter to the antenna and providing a synchro receiver at the operating station.

In the typical three-wire synchro data transmission system, the synchro transmitter includes a "rotor," or movable coil mounted for rotation on a shaft, and three stationary "stator" coils spaced 120° apart surrounding the rotor. One end of each stator coil is connected to a common point. The other ends of the stator coils are connected by suitable electrical current carrying wires or other information channels to the three stator coils in the synchro receiver. A sinusoidal reference signal is applied to the rotor coil of the synchro transmitter, and a similar sinusoidal reference signal is applied to the rotor coil at the synchro receiver. The magnetic field generated by the rotor coil in the synchro transmitter induces sinusoidal voltages in the three stator coils of the synchro transmitter, the phases and amplitudes of the induced voltages depending upon the angular position of the rotor. The induced sinusoidal voltages are transmitted to the three stator coils of the synchro receiver via the three connecting wires or data channels. The resulting currents flowing in the stator coils of the synchro receiver set up magnetic fields which cause the rotor of the synchro receiver to position itself at an angle corresponding to the angle of the rotor in the synchro transmitter. The angle of the rotor of the synchro receiver thus indicates to the operator the angle of the remote device, such as a radar antenna, which is mechanically coupled to the synchro transmitter.

However, in many modern applications, the information from the remote location is intended to be fed into a digital computer for processing. It is therefore necessary to convert the information contained in the sinusoidal signals from the synchro transmitter to digital form. More particularly, it is desirable to convert the synchro signals into a digital representation of the shaft angle of the remote device.

It is therefore an object of this invention to provide an improved synchro-to-digital converter.

It is also an object of this invention to provide a synchro-to-digital converter which does not depend for its accuracy upon the accuracy of the phase relationships between the synchro signals and the reference signal as received at the operating station.

It is another object of this invention to provide a synchro-to-digital converter in which the digital signal is derived from the amplitudes of the synchro signals.

In accordance with the above and other objects, the present invention provides a synchro-to-digital converter including demodulators for demodulating each of the synchro signals, a sampling gate or sampling switch associated with each demodulator for successively sampling each of the demodulated synchro signals, a filter for filtering the combined output signals from the sampling gates to produce an output signal having a fundamental frequency component, the phase of which corresponds to the angle of the rotor of the remote synchro transmitter plus a constant angle, and a device for detecting a predetermined feature, such as a zero-crossing, of the output signal of the filter.

A digital counter is started by a predetermined reference signal and stopped by a signal from the feature detecting device in order to measure the phase of the filter output signal.

Other objects and advantages of the present invention will be apparent from the following detailed description and accompanying drawings which set forth, by way of example, the principle of the present invention and the preferred embodiments for carrying out that principle.

IN THE DRAWINGS:

FIG. 2 is a block diagram of a second embodiment of the synchro-to-digital converter of the present invention;

FIG. 3 is a block diagram of a third embodiment of the synchro-to-digital converter of the present invention;

Before describing in detail the preferred embodiment and the several alternative embodiments of the subject synchro to digital convertor, it will be helpful to consider some of the theoretical aspects of the present invention. In the conventional three-wire synchro data transmission system, the three output voltages $e_1$, $e_2$, and $e_3$ of the synchro transmitter, referred to a common point, are as follows:

$$e_1 = A \cos(\phi - 120) \sin \omega t$$
$$e_2 = A \cos(\phi) \sin \omega t$$
$$e_3 = A \cos(\phi + 120) \sin \omega t$$

where $A$ is a constant and $\omega$ is the angular frequency of the signal.

These voltages may be considered as sinusoidal carriers ($\sin \omega t$ multiplied by a modulating factors $A \cos(\phi-120)$, $A \cos(\phi)$ and $A \cos(\phi + 120)$). These modulating factors correspond exactly to three equispaced samples of a sine wave. More particularly, the modulating factors correspond to samples taken at intervals of one third of the period of a sine wave having an amplitude of A. The temporal sampling theorem states that three equispaced samples are sufficient to reconstruct a sine wave signal.

Thus, if the three synchro output signals were demodulated and the demodulated signals were sampled by three equispaced sampling pulses, or, if by any other method three equispaced pulses having amplitudes proportional to the three synchro output voltages were to be developed, the phase of the fundamental frequency component of these pulses would be proportional to the shaft angle of the rotor of the synchro transmitter. More precisely, the phase, $\phi$, of the fundamental frequency component would be related to the rotor angle, $\theta$, by the following equation:

$$\phi = \theta + \alpha$$

where $\alpha$ is some arbitrary constant.

Figure 5A:
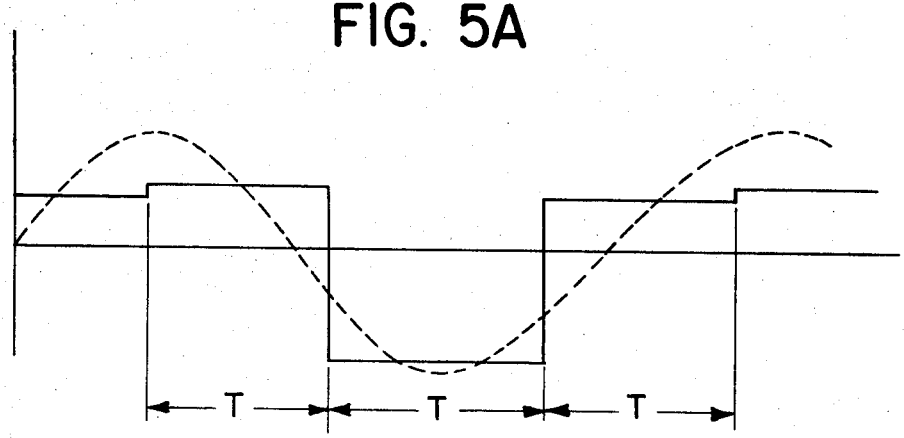
FIG. 5A is a graph of a typical sample pulse train derived from the synchro signals.
Figure 5B:
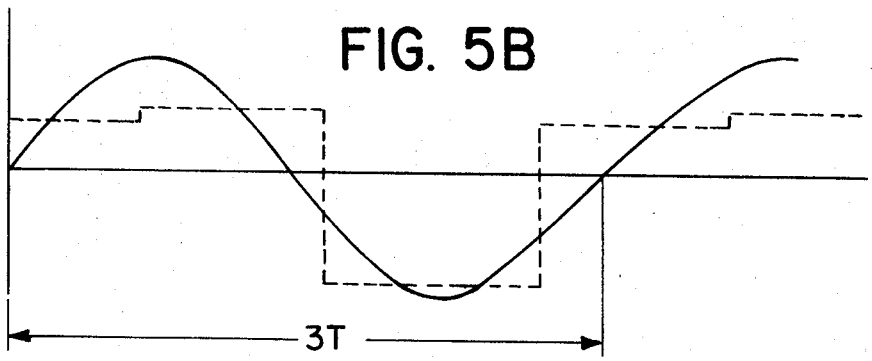
FIG. 5B is a graph of the fundamental frequency component of the sample pulse train shown in FIG. 5A.
Figure 5C:
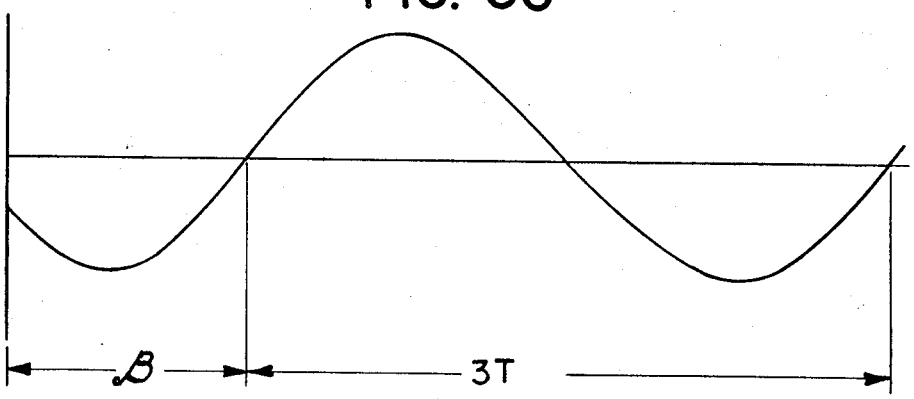
FIG. 5C is a graph of the waveform shown in FIG. 5B after having been delayed by the filter time delay.

The fundamental frequency of the train of equispaced samples can be extracted by means of a low-pass filter or a band-pass filter having a cut-off frequency just above the fundamental frequency of the train of samples. If the time interval between successive equispaced samples is $T$, the fundamental frequency is equal to $1/3T$. The filter output signal, $e_0$ would be of the following form:

$$e_0 = B \cos\left(\frac{2\pi t}{3T} + \phi + \alpha + \beta\right)$$

where $\beta$ is the phase lag of the filter. A typical filter input signal is shown in FIG. 5A, and the corresponding filter output signal is shown in FIG. 5B.

The phase lag introduced by the filter can be measured by applying to the filter a reference signal having the same fundamental frequency as the information signal described above. One way of generating a suitable reference signal is to use the three equispaced sampling pulse trains to sample three fixed reference levels. For example, the three equispaced sampling pulse trains can be used to successively sample reference levels of 0, +K and −K volts. The resulting train of samples will have the same fundamental frequency as the information bearing samples, so that when the train of reference samples is applied to the filter, the filter output will be a sinusoidal signal of the same frequency as the information signal. Further, the reference signal will be affected by the filter phase lag in exactly the same amount as the information signal. The phase difference between the reference signal and the information signal derived from the synchro outputs will be equal to the synchro shaft angle plus or minus a fixed constant.

Figure 1:
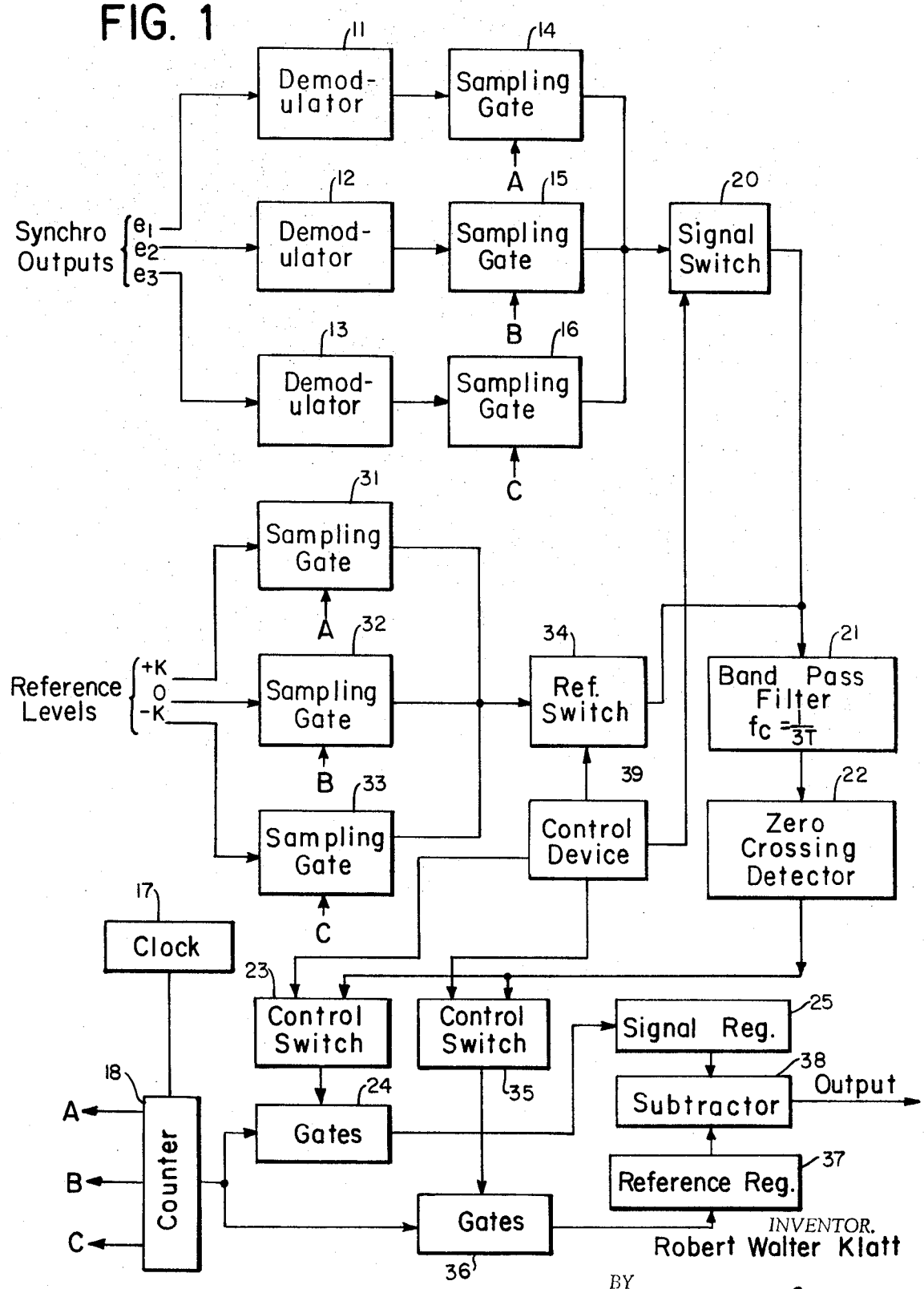
FIG. 1 is a block diagram of an embodiment of the synchro-to-digital converter of the present invention.

Referring now to FIG. 1 of the drawings, there is shown a block diagram of an embodiment of the synchro to digital converter of the present invention. The sinusoidal output signals $e_1$, $e_2$ and $e_3$ from the synchro transmitter are applied respectively to the demodulators 11, 12 and 13. The output signals from the demodulators 11, 12 and 13 are DC voltages proportional to the amplitudes of the sinusoidal output signals $e_1$, $e_2$ and $e_3$ from the synchro transmitter. The DC output signals from the modulators 11, 12 and 13 are applied respectively to sampling gates 14, 15 and 16 which are controlled by three equispaced sampling pulse trains designated A, B and C in FIG. 1.

In referring to the three sampling pulse trains A, B and C as "equispaced" sampling pulse trains, it is meant that these three sampling pulse trains cause the sampling gates 14, 15 and 16 to successively sample the output signals from demodulators 11, 12 and 13 at equal time intervals. For example, sampling pulse train A might open sampling gate 14 at a time $t=0$ while sampling gates 15 and 16 remain closed, then sampling pulse train B will open sampling gate 15 at a time $t=T$ while sampling gates 14 and 16 are closed, then sampling pulse train C will open sampling gate 16 at a time $t=2T$ while sampling gates 14 and 15 are closed, then sampling pulse train A will open sampling gate 16 at a time $t=3T$, etc.

The three sampling pulse trains A, B and C are preferably generated by the high speed digital clock 17 and digital counter 18. If it is desired to resolve the angle of the rotor in the synchro transmitter to an accuracy of 0.1 degrees, the digital counter 18 would be made to count modulo 3,600. The three sampling pulse trains A, B and C are derived from the digital counter 18 by conventional circuitry. For example, sampling pulse A might be derived from the first 1,200 counts of counter 18, sampling pulse B might be derived from the second 1,200 counts, and sampling pulse C might be derived from the third 1,200 counts. Although the length of each sampling pulse is preferably equal to 1,200 clock pulses, it will be appreciated by those skilled in the art that shorter sampling pulses may be employed if desired. However, the three sampling pulses should be of equal length, and the time interval between the start of one sampling pulse and the start of the next sampling pulse should be 1,200 counts for the case of three sampling pulse trains derived from a modulo 3,600 digital counter.

The output signals from the three sampling gates 14, 15 and 16 are combined and fed through a signal switch 20 to a band pass filter 21 which has an upper cut-off frequency $f_c$ which is slightly higher than the fundamental frequency of the train of samples applied to it. More precisely, the upper cut-off frequency $f_c$ of the filter 21 is preferably slightly greater than $1/3T$, where $T$ is the time interval between successive sampling pulses. The output signal from filter 21 is, as explained above, a sine wave, the phase of which corresponds to the angle of the synchro rotor plus the phase lag of the filter 21 plus a constant.

Although a band pass filter is illustrated in the block diagram of FIG. 1, it will be appreciated by those skilled in the art that, in many instances, the function of filter 21 might be accomplished by a low-pass filter.

The output signal from filter 21 is applied to the zero-crossing detector 22 which produces an output signal at the instant when the sine wave output signal from filter 21 crosses the zero axis. In other words, the zero-crossing detector 22 produces an output signal at the moment when the sine wave output signal from filter 21 passes through 0 volts. The zero-crossing detector 22 may be arranged so that it produces an output signal only when the sine wave output from filter 21 crosses the zero axis in a positive-going direction, or only when the output from filter 21 crosses the 0 axis in a negative-going direction.

Although a zero-crossing detector 22 is employed in the embodiment shown in FIG. 1, it will be apparent to those skilled in the art that other devices for detecting a predetermined feature of a sine wave might be employed within the spirit and scope of the present invention. For example, the synchro to digital converter of the present invention might be designed to use a device for detecting positive or negative peaks of the sine wave output signal from filter 21.

The output signal from zero-crossing detector 22 is applied through control switch 23 to open gates 24 and thus transfer the contents of counter 18 to signal register 25. The digital number thus stored in signal register 25 corresponds to the shaft angle of the rotor of the synchro transmitter plus the phase lag of the filter 21 plus a constant. As explained above, the effect of the phase lag produced by filter 21 can be eliminated by applying a reference signal of known phase angle to the filter 21, measuring the filter phase lag, and subtracting the measured filter phase lag from the measured phase of the information signal represented by the digital quantity stored in signal register 25.

As shown in FIG. 1, the reference signal is generated by using the three sampling pulse trains A, B and C to sample three fixed DC reference levels, +K, 0 and −K. One reference level is applied to sampling gate 31 which is controlled by pulse train A. Another reference level is applied to sampling gate 32 which is controlled by pulse train B. The third reference level is applied to sampling gate 33 which is controlled by sampling pulse train C. The combined output signals from sampling gates 31, 32 and 33 are applied through reference switch 34 to band pass filter 21. The resulting output signal from filter 21 is a sine wave having a phase angle corresponding to the filter phase lag plus a constant. This signal is applied to the zero-crossing detector 22 which, as in the case of the information signal, produces an output pulse at the instant when the sine wave output signal from filter 21 crosses the zero axis.

The output signal from zero-crossing detector 22 is applied through control switch 35 to open gate 36 and thus transfer the contents of counter 18 to reference register 37.

The contents of the reference register 37 are then subtracted from the contents of signal register 25 by subtractor 38. The remainder is a digital number representing the shaft angle of the rotor of the synchro transmitter plus a constant. The constant, which may be measured and determined during the calibration of the system, may then be subtracted if desired in order to produce a direct digital representation of the shaft angle of the rotor of the synchro transmitter. Alternatively, the constant might be eliminated during the calibration of the system by adjusting the values of the DC reference levels used in generating the reference signal.

The control device 39 controls the routing of the information signal and the reference signal through the filter 21, and controls the transfer of the contents of digital counter 18 to the signal register 25 and the reference register 37. More particularly, control device 39 opens signal switch 20 to allow the combined samples from sampling gates 14, 15 and 16 to pass through band pass filter 21. Control device 39 causes signal switch 20 to remain open for a sufficient length of time to allow the filter transients to die out. This means that signal switch 20 must remain open for several complete sampling cycles, or several cycles of digital counter 18. After the filter transients have died down, control device 39 opens control switch 23 so that an output signal from zero-crossing detector 22 will be enabled to open gates 24 so as to "strobe" or transfer the contents of digital counter 18 to signal register 25.

Immediately thereafter, control device 39 closes signal switch 20 and control switch 23 and opens reference switch 34 to allow the combined signals from sampling gates 31, 32 and 33 to pass through the filter 21. Again, control device 39 holds reference switch 34 open for a sufficient length of time, to allow the filter transients to die down. Control device 39 then opens control switch 35 so as to enable an output signal from zero-crossing detector 22 to open gates 36 and thus transfer the contents of counter 18 to reference register 37. Immediately thereafter, control device 39 closes reference switch 34 and control switch 35 and repeats the previous operations beginning with the opening of signal switch 20.

The overall result of these operations is to produce at the output of subtractor 38 a series of digital representations of the shaft angle of the rotor of the synchro transmitter.

Referring now to FIG. 2 of the drawings, there is shown an alternative embodiment of the synchro to digital converter of the present invention. In the alternative embodiment shown in FIG. 2, the sinusoidal output signals from the synchro transmitter are demodulated and successively sampled, and the combined samples are multiplied by a reference signal having the same fundamental frequency as the train of combined samples. The product of the information bearing sample pulse train and the reference signal is applied to a polarity detector, and the phase difference between the reference signal and the information bearing sample pulse train is adjusted until a null output is obtained from the polarity detector. The phase adjustment required to produce a null output from the polarity detector corresponds to the shaft angle of the rotor of the synchro transmitter.

Referring in detail to the block diagram of FIG. 2, the sinusoidal output signals $e^1$, $e^2$ and $e^3$ from the synchro transmitter are applied, respectively, to demodulators 41, 42 and 43. The output signals from demodulators 41, 42 and 43 are DC voltages proportional to the amplitudes of the sinusoidal output signals $e_1$, $e_2$ and $e_3$ from the synchro transmitter. The output signals from demodulators 41, 42 and 43 are applied, respectively, to sampling gates 44, 45 and 46 which are controlled by the three equispaced sampling pulse trains designated A, B and C.

The three sampling pulse trains A, B and C are preferably generated by the digital counter 47 which is driven by the high speed digital clock 48 through an inhibitor 49, the purpose of which will be explained in greater detail hereinafter.

As explained above in connection with the apparatus shown in FIG. 1, each of the three sampling pulses A, B and C preferably corresponds to one-third of a full cycle of the digital counter 47.

The combined output signals from sampling gates 44, 45 and 46 are applied to the two sampling switches 51 and 52. Sampling switch 51 is controlled by the sampling pulse train X, and sampling switch 52 is controlled by the sample pulse train Y.

The sample pulse trains X and Y are essentially square waves of opposite polarity. Each of the sample pulse trains X and Y have the same fundamental frequency as the train of combined output samples from sampling gates 44, 45 and 46.

In the block diagram shown in FIG. 2, the sampling pulse trains X and Y are generated by the digital counter 53 which is driven by the high speed digital clock 48 through an inhibitor 54, the purpose of which will be explained in greater detail hereinafter. Digital counter 53 goes through a full cycle of operation in the same time as does digital counter 47. For example, if digital counter 47 is designed to count modulo 3,600, digital counter 53 is also designed to count modulo 3,600. However, the two sampling pulses X and Y derived during each cycle of counter 53 are equal to one-half of the full cycle of the counter or 1,800 counts rather than one-third of the full cycle of the counter as in the case of samples pulses A, B and C derived from counter 47.

The output signals from sample switches 51 and 52 are applied to the differential amplifier 55, and the output signal from differential amplifier 55 passes through low-pass filter 56 to polarity detector 57. The combination of sampling switches 51 and 52, differential amplifier 55 and low-pass filter 56 operate as multiplier for multiplying the information bearing sample pulse train which consists of the combined output signals from sampling gates 44, 45 and 46, and the reference signal which consists of the two sampling pulse trains X and Y.

The output signal from polarity detector 57 is applied to the control device 58 which operates inhibitor 49 to inhibit the flow of pulses from clock 48 to counter 47 is the output signal from polarity detector 57 is of one polarity, and operates inhibitor 54 to inhibit the flow of pulses from clock 48 to counter 53 if the output signal from polarity detector 57 is of the opposite polarity. Pulses flow from clock 48 to both counters 47 and 53 if there is a null output signal from polarity detector 57.

When counter 53 reaches a predetermined count, it produces an output pulse on line 59 which opens data gates 60 to transfer the contents of counter 47 to an output register not shown. When the system is properly calibrated, the digital number which is thus transferred to the output register corresponds to the shaft angle of the rotor of the synchro transmitter. Calibration of the system is accomplished by adjusting the predetermined count at which counter 53 produces a pulse on line 59.

Further simplification of the synchro to digital converter shown in FIG. 2 may be accomplished by logically combining the A, B, C and X, Y sampling pulse trains. FIG. 3 shows a block diagram of a portion of a synchro to digital converter in which the A, B, C and X, Y sampling pulse trains are logically combined. The sinusoidal output signals $e_1$, $e_2$ and $e_3$ from the synchro transmitter are applied, respectively, to the demodulators 61, 62 and 63. The output signals from the demodulators 61, 62 and 63 are DC voltages proportional to the amplitudes of the sinusoidal signals $e_1$, $e_2$ and $e_3$. The DC output signal from demodulator 61 is applied to gate 64 which opens in response to the simultaneous occurrence of an A sampling pulse and an X sampling pulse, and to gate 65 which opens in response to the simultaneous occurrence of an A sampling pulse and a Y sampling pulse. The DC output signal from demodulator 62 is applied to gates 66 which opens in response to the simultaneous occurrence of B and X sampling pulses and to gate 67 which opens in response to the simultaneous occurrence of B and Y sampling pulses. The DC output signal from demodulator 63 is applied to gate 68 which opens in response to the occurrence of C and X pulses, and to gate 69 which opens in response to simultaneous C and Y pulses. The combined output signals from gates 64, 66 and 68 are fed through a low-pass filter comprising, for example, resistor 71 and capacitor 72 and applied to differential amplifier 73. The combined output signals from gates 65, 67 and 69 are fed through a low-pass filter including, for example, resistor 74 and capacitor 75, and applied to differential amplifier 73. The output signal from differential amplifier 73 is applied to a polarity detector (not shown) similar to the polarity detector 57 shown in FIG. 2. The remaining functions required to complete the synchro to digital conversion may be performed by the sub-combination of elements described in connection with FIG. 2, more particularly, digital clock 48, counters 47 and 53, inhibitors 49 and 54, control device 58 and data gates 60.

Figure 4:
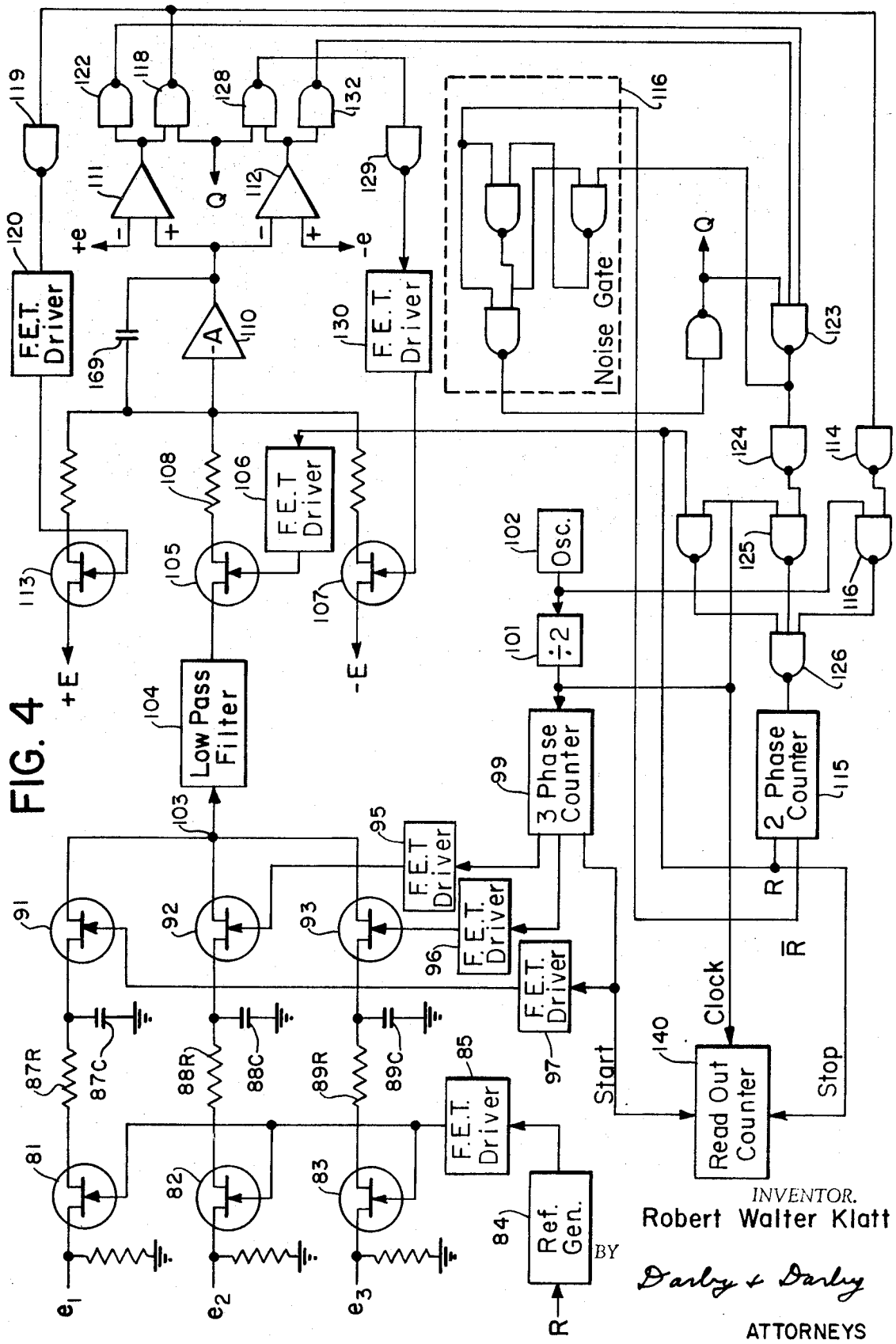
FIG. 4 is a schematic diagram of a fourth embodiment of the synchro to digital converter of the present invention.

FIG. 4 shows a schematic diagram of another form of synchro-to-digital converter according to the present invention which is shown in block diagram form in FIG. 3. In the schematic diagram shown in FIG. 4, each of the sinusoidal signals from the synchro transmitter is demodulated by a field effect transistor (F.E.T.) demodulator switch in combination with an RC network which acts as a low-pass filter. More particularly, the sinusoidal output signals $e_1$, $e_2$ and $e_3$ are applied to the input electrodes of the three F.E.T. switches 81, 82 and 83, respectively.

The synchro reference signal, R, is applied to the reference generator 84 which generates a control pulse which is "on" between the 30° and 150° points of the synchro reference voltage. The control pulse from the reference generator 84 is amplified by the F.E.T. driver 85 and applied to the gate electrodes of F.E.T. switches 81, 82 and 83. The control pulse closes the F.E.T. switches for the time interval between the 30° and 150° points of the synchro reference voltage.

The output signals from the F.E.T. switches 81, 82 and 83 are applied to the RC filter networks 87R, 87C and 88R, 88C and 89R, 89C, and DC voltages proportional to the amplitudes of the synchro transmitter output signals are developed on the capacitors 87C, 88C and 89C. The demodulation of the synchro output voltages is synchronous, and the DC voltages developed on the capacitors 87C, 88C and 89C may be of either polarity. The closure period (30° to 150°) of the F.E.T. demodulator switches 81, 82 and 83 is chosen to eliminate the effects of possible third harmonic content in the synchro transmitter output signals.

The DC voltages stored on capacitors 87C, 88C and 89C are sampled by the three F.E.T. sampling gates 91, 92 and 93 which are driven by the three F.E.T. drivers 95, 96 and 97 which are controlled by the three-phase counter 99. Assuming, for purposes of illustration, that the desired resolution of the system is 0.1°, the three-phase counter 99 counts modulo 3,600. The counter 99 is driven by the output signal from a divider 101 which divides, by a factor of 2, the output signal from the digital oscillator or clock 102. The clock rate need not be related to the synchro carrier frequency.

The output signals from the three-phase counter 99 are in the form of three pulse trains having the same repetition rate. The width of the pulses in each pulse train is equal to one third of the period of the pulse train which is in turn equal to one-third of a full cycle of the counter 99. Further, the phase of each pulse train differs by one-third of a period from the two other pulse trains. Thus, if the three pulse trains are labeled A, B and C, the trailing edges of the A pulses coincide with the leading edges of the B pulses, the trailing edges of the B pulses coincide with the leading edges of the C pulses, and the trailing edges of the C pulses coincide with the leading edges of the A pulses.

The three F.E.T. gates 91, 92 and 93 operate under control of the three pulse trains A, B and C to sequentially transfer the DC voltages stored on capacitors 87C, 88C and 89C to the common summing point 103. The signal at this summing point 103 contains a fundamental frequency component which is equal to the fundamental frequency of the three sampling pulse trains A, B and C. The phase of the fundamental frequency component of the signal at summing point 103, relative to some reference point in the A, B and C pulse trains, is equal to the shaft angle of the synchro transmitter. The signal at the summing point 103 may also contain harmonics of the fundamental frequency which would cause undesirable errors. These harmonics are removed by the low pass filter 104 which may be of a type well-known to those skilled in the art, such as, for example, a three-pole Butterworth filter.

The output signal from filter 104 is applied to the input electrode of F.E.T. switch 105 which is driven by the F.E.T. driver 106. Switch 105 is closed for half the period of the three-phase counter 99. When F.E.T. switch 105 is closed, F.E.T. switches 113 and 107 are open, and the output signal from the filter 104 is connected to the input of an integrator consisting of resistor 108, capacitor 169, and amplifier 110.

If the interval during which F.E.T. switch 105 is closed is centered on one of the zero crossings of the fundamental frequency component of the output of filter 104, the output of the integrator will be zero when F.E.T. switch 105 is opened. If this timing condition is not met, the output of the integrator will be non-zero when switch 105 is opened. The output signal from the integrator is applied to the two comparators 111 and 112. The output signals from the two comparators 111 and 112 indicate whether the output from the integrator is greater than +E, less than −E or between +E and −E; where E is a small voltage determined by the required measurement resolution.

The output signals from the comparators 111 and 112 are applied to logic circuitry which provides the control function which serves to center the closing of F.E.T. switch 105 on a zero crossing of the fundamental frequency component of the output signal from filter 104.

The two-phase counter 115 produces a pair of reference pulse trains R and $\overline{R}$. Two-phase counter 115 is normally driven at the same rate as three-phase counter 99. The frequency of the fundamental component of the two reference pulse trains R and $\overline{R}$ is the same as the frequency of the fundamental component of the sampling pulse trains A, B and C which are produced by the three-phase counter 99. The reference pulse trains R and $\overline{R}$ are essentially square waves 180° out of phase with each other.

The control function can readily be understood by following the operation of the system starting at the moment when the reference pulse train R goes positive. The pulse R closes F.E.T. switch 105, and, at the same time, the $\overline{R}$ pulse sets the noise gate register 116. During the time that the F.E.T. gate 105 is closed, the two-phase counter 115 is driven by the same clock pulse train as the three-phase counter 99 so that the two counters 115 and 99 remain in phase with each other.

When the reference pulse train R goes negative, the F.E.T. gate 105 opens. If the output of the integrator is now between +E and −E, the outputs of both comparators 111 and 112 will be negative, and the two-phase counter 115 will continue to count at the same rate as three-phase counter 99. If, however, the output signal from the integrator is greater than +E, the output of comparator 111 will be positive. The positive signal at the output of comparator 111 operates through logic gates 118 and 119 to cause F.E.T. driver 120 to close F.E.T. switch 106, thus connecting the input of the integrator to the positive reference voltage +E and thereby causing the output of the integrator to decrease linearly toward zero. The positive signal at the output of comparator 111 also operates through logic gates 122, 123, 124, 125 and 126 and logic gates 118, 114, 116 and 126 to cause the two-phase counter 115 to count at twice the rate of the three-phase counter 99, thus changing the phase relationship of the reference pulse trains R and $\overline{R}$ with respect to the sampling pulse trains A, B and C and reducing the phase "error" between the R sampling pulse train and the signal at the output of low-pass filter 104. This process ends when the output of the integrator becomes less than +E, thus simultaneously causing F.E.T. switch 106 to open and causing the same clock rate to be applied to both counters 115 and 99.

If, on the other hand, the output signal from the integrator is less than −E when the R reference pulse goes negative, the output of comparator 112 will be positive. The positive signal at the output of comparator 112 operates through logic gates 128 and 129 to cause F.E.T. driver 130 to close F.E.T. switch 107 thus connecting the input of the integrator to the negative reference voltage −E, and thereby causing the output of the integrator to linearly increase toward zero. At the same time, the positive signal at the output of comparator 112 operates through logic gates 132, 123, 124, 125 and 126 to cut off the flow of clock pulses to two-phase counter 115, thus reducing toward zero the phase "error" between the reference pulse train R and the output signal from low-pass filter 104. This process ends when the output of the integrator becomes greater than −E, thus causing F.E.T. switch 107 to open and causing the two counters 115 and 99 to be driven, once again, at the same rate.

From the foregoing, it will be apparent that the control logic causes the transition points of the R square wave reference signal to become aligned with the 90° and 270° points of the sine wave signal output from low-pass filter 104.

The digital output signal of the synchro-to-digital converter shown in FIG. 4 is provided by the readout counter 140. The readout counter 140 is driven by the same clock signal as three-phase counter 99. Counter 140 is started by the A pulse from three-phase counter 99, and is stopped by the R pulse from two-phase counter 115. The contents of the readout counter 140 therefore indicates the difference between the states of the three-phase counter 99 and the two-phase counter 115. This is equal to the shaft angle of the synchro transmitter plus a constant. Since the counters operate modulo 3,600, the resolution of the system is 0.1°.

Although the fundamental frequency of the sampling pulse trains A, B and C need not be related to the synchro carrier frequency, certain advantages may be derived from designing the fundamental frequency of the sampling pulse trains A, B and C to be one-half of the synchro carrier frequency. More particularly, if the fundamental frequency of the sampling pulse trains A, B and C is equal to one-half of the synchro carrier frequency, the interval during which the output signal from filter 104 is integrated is equal to one period of the synchro carrier frequency with the result that any synchro carrier signals which might reach the integrator and might otherwise cause an error, will integrate to zero.

The noise gate 116 is not essential to the operation of the synchro-to-digital converter shown in FIG. 4. The noise gate 116 guarantees that the clock pulse rates applied to the two counters 99 and 115 will be equal at all times except the time between the opening of F.E.T. gate 105 and the moment when the magnitude of the output signal from the integrator becomes less than E.

While the principles of the present invention have been illustrated by reference to several specific embodiments of synchro-to-digital converters, it will be apparent to those skilled in the art that certain modifications and adaptations of the illustrative embodiments may be made without departing from the spirit and scope of the present invention as set forth with particularity in the appended claims.

What is claimed is:

1. Apparatus for converting synchro output signals to a digital signal representing the angle of the synchro rotor, said apparatus comprising:
   means for demodulating each of said synchro output signals;
   a digital counter;
   means for deriving a plurality of sampling pulse trains from said digital counter;
   a plurality of sampling gates connected to said demodulating means, one sampling gate for each of the demodulated synchro output signals, each sampling gate being responsive to a different one of said sampling pulse trains;
   means for combining the output signals from said sampling gates;
   means for filtering the output signal from said combining means to provide a sinusoidal output signal, the phase of the output signal from said filtering means corresponding to the angle of said synchro rotor plus a constant angle;
   means for detecting a predetermined feature of said sinusoidal output signal;
   means for starting said digital counter in synchronization with said sampling gates;
   a register for receiving the contents of said digital counter; and
   means responsive to said detecting means for transferring the contents of said digital counter to said register upon occurrence of said predetermined feature of said sinusoidal signal.

2. The apparatus of claim 1 further comprising:
   means for subtracting from the contents of said register a digital quantity corresponding to said constant angle to provide a digital quantity corresponding to the angle of said synchro rotor.

3. The apparatus of claim 2 wherein said subtracting means comprises:
   means for generating a digital quantity corresponding to said constant angle; and
   means for subtracting said digital quantity from the contents of said register to provide a digital quantity corresponding to the angle of said synchro rotor.

4. The apparatus of claim 3 wherein said means for generating a digital quantity corresponding to said constant angle comprises:
   a second register;
   means for generating a sinusoidal reference signal, the phase angle of said sinusoidal reference signal corresponding to said constant angle;
   means for applying said sinusoidal reference signal to said means for detecting a predetermined feature of said sinusoidal output signal; and
   means responsive to an output signal from said means for detecting a predetermined feature of said sinusoidal output signal for transferring the contents of said digital counter to said second register.

5. The apparatus of claim 4 wherein said means for generating said sinusoidal reference signal comprises:
   a source of DC reference signals;
   means for successively sampling said DC reference signals;
   means for combining the output signals from said means for sampling said DC reference levels; and
   means for filtering the output signal from said combining means to provide said sinusoidal reference signal.

6. The apparatus of claim 1 wherein said means for detecting a predetermined feature of said sinusoidal output signal comprises means for detecting a zero-crossing of said sinusoidal signal.

7. Apparatus for converting synchro output signals to a digital signal representing the angle of the synchro rotor, said apparatus comprising:
   means for demodulating each of said synchro output signals;
   means for successively sampling the output signals from said demodulating means at equal intervals;
   means for combining the output signals from said sampling means;
   means for generating a reference signal of the same fundamental frequency as the output signal from said combining means;
   means for multiplying said reference signal and said output signal from said combining means;
   means for detecting a null output from said multiplying means;
   means for adjusting the phase difference between said output signal from said combining means and said reference signal, the phase adjustment required to produce a null output from said multiplying means corresponding to the angle of said synchro rotor plus a constant angle; and
   means for producing a digital output from the output of said phase adjusting means corresponding to the angle of said synchro rotor.

8. The apparatus of claim 7 wherein said means for successively sampling the output signals from said demodulating means comprises:
   means for generating a plurality of equispace sampling pulse trains; and
   a plurality of sampling gates, one sampling gate for each demodulated synchro output signal, each sampling gate being responsive to a different sampling pulse train.

9. The apparatus of claim 8 wherein said means for generating said equispace sampling pulse trains comprises:
   a clock pulse generator;
   a cyclic digital counter driven by said clock pulse generator; and
   means responsive to said digital counter for deriving a plurality of equispace sampling pulses from said counter during each cycle of operation thereof.

10. The apparatus of claim 9 wherein said reference signal is a square wave signal, and wherein said means for generating said reference signal comprises:
    a second digital counter driven by said clock pulse generator; and
    means for deriving said square wave reference signal from said second digital counter.

11. The apparatus of claim 10 wherein said multiplying means comprises:
    means for filtering the output signal from said combining means to provide a sinusoidal output signal, the phase of said filter output signal corresponding to the angle of said synchro rotor;

a switch connected to the output from said filter means, said switch being enabled by one-half cycle of said square wave reference signal; and an integrator connected to the output from said switch, said null detector being connected to the output from said integrator.

12. The apparatus of claim 10 wherein said multiplying means comprises:

a pair of switches connected to the output from said combining means, one of said switches being enabled by one-half cycle of said square wave reference signal and the other of said switches being enabled by the other half-cycle of said square wave reference signal;

a differential amplifier for amplifying the difference between the output signals from said switches; and a low-pass filter connected to the output of said differential amplifier.

13. The apparatus of claim 12 wherein said null detecting means comprises a polarity detector connected to the output of said low-pass filter.

14. The apparatus of claim 13 wherein said means for adjusting the phase difference between said reference signal and said output signal from said combining means comprises:

means responsive to the output signal from said polarity detector for inhibiting the flow of pulses from said clock pulse generator to said first digital counter in response to an output signal of one polarity from said polarity detector, and for inhibiting the flow of pulses from said clock pulse generator to said second digital counter in response to an output signal of the opposite polarity from said polarity detector.

15. The apparatus of claim 14 wherein said means for producing a digital output from said phase adjusting means corresponding to the angle of said synchro rotor comprises:

means responsive to a predetermined condition of said second digital counter for transferring the contents of said first digital counter to an output register, the contents of said output register corresponding to the angle of said synchro rotor.

16. Apparatus for converting synchro outputs signals to a digital signal representing the angle of the synchro rotor, said apparatus comprising:

a demodulator for demodulating each of three synchro output signals;

means for generating three equispace sampling pulse trains;

means for generating two equispace reference pulse trains;

first and second sampling gates connected to the output of the first demodulator, said first sampling gate being enabled by the combination of a first sampling pulse and a first reference pulse, and said second sampling gate being enabled by the combination of a first sampling pulse and a second reference pulse;

third and fourth sampling gates connected to the output from the second demodulator, said third sampling gate being enabled by the combination of a second sampling pulse and a first reference pulse, said fourth sampling gate being enabled by the combination of a second sampling pulse and a second reference pulse;

fifth and sixth sampling gates connected to the output of the third demodulator, said fifth sampling gate being enabled by the combination of a third sampling pulse and first reference pulse, said sixth sampling gate being enabled by the combination of a third sampling pulse and a second reference pulse;

first means for combining the output signals from said first, third and fifth sampling gates;

second means for combining the output signals from said second, fourth and sixth sampling gates;

a first low-pass filter connected to the output of said first combining means;

a second low-pass filter connected to the output from said second combining means;

a differential amplifier for amplifying the difference between the output signals from said first and second low-pass filters;

a polarity detector for detecting the polarity of the output signal from said differential amplifier; and means for adjusting the phase difference between said three sampling pulse trains and said two reference pulse trains, the phase adjustment required to produce a null output from said polarity detector corresponding to the angle of said synchro rotor.

* * * * *